July 14, 1942.        A. J. WEATHERHEAD, JR        2,289,946
NEEDLE CHECK VALVE
Filed Sept. 6, 1940
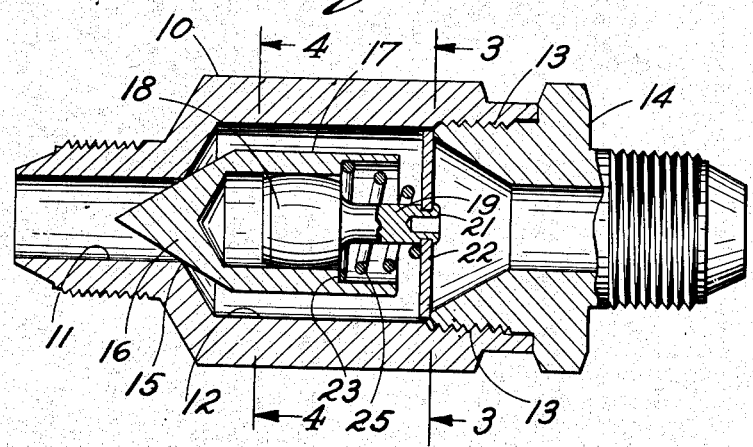
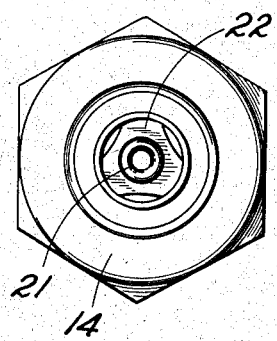
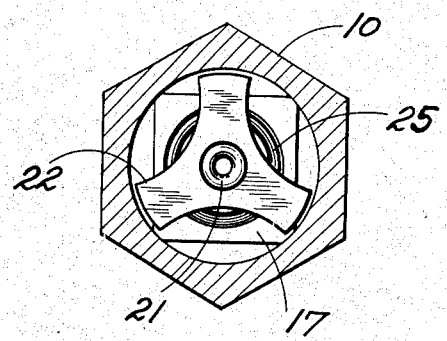
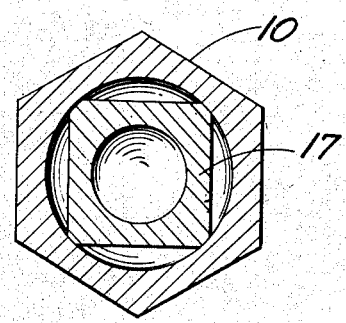
INVENTOR.
ALBERT J. WEATHERHEAD, JR.
BY
Richey & Watts
ATTORNEYS Patented July 14, 1942

2,289,946

UNITED STATES PATENT OFFICE 2,289,946

NEEDLE CHECK VALVE

Albert J. Weatherhead, Jr., Cleveland, Ohio, assignor to The Weatherhead Company, Cleveland, Ohio, a corporation of Ohio Application September 6, 1940, Serial No. 355,641

4 Claims. (Cl. 251—146)

This invention relates broadly to valves and more specifically to improvements in needle check valves having a dampening device embodied therein.

Heretofore check valves, such as those employed in high pressure fluid lines for controlling the operation of airplane wing flaps, retractible landing gears and the like have been constructed in such a manner as to chatter violently under some conditions of operation. Such chattering and vibration is not only disagreeable from the standpoint of noise but is also detrimental to the valve structure in that the constant chattering of the valve member on its seat tends to produce rapid wear of the parts. Furthermore, the valve members often became cocked or out of alignment with their seats so that the valves would not close properly and there would be a leakage of fluid therethrough.

One of the objects of the present invention is the provision of a valve having a dampening or dash pot element disposed within the valve chamber and adapted to cooperate with a valve member formed with a hollow stem to eliminate all fluttering thereof. Another object is to provide a valve member designed so that the dampening element assists in guiding the valve in alignment with its valve seat and in preventing it from becoming cocked. Another object is to provide a simple and compact check valve embodying a dampening device. Further objects are to provide such a valve which is light in weight, can be economically manufactured and which will be reliable and efficient in service.

Other objects and advantages more or less ancillary to the foregoing and the manner in which all the various objects are realized will appear in the following description, which considered in connection with the accompanying drawing, sets forth the preferred embodiment of the invention.

I preferably accomplish the above and other objects of the present invention by providing a valve casing having seated therein a valve member which has a piston slidably mounted therein, said piston having a spider secured thereto with a spring interposed between the spider and valve member for eliminating the fluttering of the valve. Preferably the piston is slibably mounted in the hollow stem of the valve member with the spring pressed spider affixed to the free end of the piston and adapted to engage a valve coupling disposed within an end of the valve casing for urging the valve member towards its seat. The piston is also arranged so that it cannot bind within the hollow stem of the valve member and further is supported in such manner that it assists in maintaining the valve in alignment with its valve seat.

Referring to the drawing wherein the preferred embodiment of the invention is illustrated, Fig. 1 is a vertical sectional view of the needle check valve embodied in the present invention; Fig. 2 is an end view of a valve coupling secured within the valve casing; Fig. 3 is a transverse sectional view showing the spider disposed within the valve chamber, the section being taken on a plane indicated by line 3—3 of Fig. 1; and Fig. 4 is a transverse sectional view of the needle valve supported in the valve chamber and showing the rounded edges of the needle valve engaging the walls of the chamber, the section being taken on a plane indicated by line 4—4 of Fig. 1.

Referring to Fig. 1, there is shown a check valve casing 10 having formed integrally therewith an inlet port 11 which communicates with a chamber 12 in the casing. Extending from the chamber 12 and in axial alignment with the inlet port 11 there is an outlet port 13 which is threaded internally for the reception of a valve coupling 14.

A valve seat 15 is formed in the chamber 12 at the termination of the inlet port, upon which a needle valve 16 is adapted to be seated. The needle valve 16 is provided with a hollow stem 17 which is adapted to receive a piston 18 having a piston rod 19 thereon. As shown in Fig. 1, the piston 18 is formed with a convex surface which enables the valve stem 17 to have a free sliding movement with respect to the piston during the actuation of the needle valve 16 and prevents the piston from binding within the hollow stem 17. While the clearance between the piston and valve stem is of such a magnitude as to permit fluid to flow slowly past the piston, it is not sufficient to permit the piston to have a loose or sloppy fit within the valve stem.

By forming the piston 18 with a convex or arcuate surface, the central portion of the piston is the only part that is in intimate contact with the inner walls of the hollow valve stem 17. The clearance between the hollow valve stem and the head and base portions of the piston permits manufacutring tolerances to be increased and prevents binding between the piston and valve stem, even though the spider 22 may not hold the piston in exact axial alignment with the hollow stem 17. It is sufficient that only the central portion of the piston be in intimate contact with the hollow valve stem to insure a proper action of the parts while still maintaining the valve in alignment with the valve seat.

The spider 22 is secured to the reduced end of the piston rod 19 by a pin 21 and is urged by a spring into engagement with the end of the valve coupling 14 that extends within the chamber 12. The arms of the spider 22 terminate adjacent the walls of the valve casing 10, which define the chamber 12, and are adapted to cooperate with the piston 18 in retaining the needle valve 16 in alignment with its seat. The valve stem 17 is counter bored to form a ledge 23 upon which is disposed the enlarged end of a cone shaped coil spring 25 which encircles the piston rod 19.

As shown in Fig. 4, the rectangular shaped valve stem 17 has the corners thereof rounded to conform to the contour of the cylindrical chamber 12 in the valve casing 10. The chamber constitutes a pilot for the valve stem and cooperates in this respect with the piston 18 and spider 22 in maintaining the needle valve 16 in alignment with the valve seat. Such an arrangement prevents the needle valve from becoming cocked during its actuation and insures a positive seating of the valve under all conditions while still allowing the valve and valve stem to have a free movement within the valve chamber 12.

In a typical installation a fluid under a pressure of about three pounds per square inch is sufficient to unseat the needle valve 16 from its seat. In the unseating operation the spider 22 is retained against the valve coupling 14 by the spring 25 so that the fluid flowing through the inlet port 11 forces the needle valve 16 towards the valve coupling, thus compressing the spring 25 between the spider 22 and the ledge 23 formed in the valve stem 17. As the spring is compressed by the movement of the needle valve 16 the piston 18 moves to the bottom of the hollow valve stem 17, at which point the valve is fully opened. The needle valve is seated when the pressure of the fluid in the line becomes so nearly the same on both sides of the valve that the valve spring 25 is sufficient to overcome any difference in pressure acting on opposite ends of the valve 16. With the valve in its closed position a pressure of fifteen hundred pounds per square inch or better may be maintained in the high pressure line between the valve and the actuated mechanism, thus retaining the particular mechanism in an opened or closed position depending upon its function. If for any reason the pressure in this portion of the high pressure line should drop below the pressure in the line leading to the valve the needle valve 16 will be unseated to allow sufficient fluid to flow therethrough to raise the pressure in the line.

In service, the piston 18, acting in the valve stem 17 slows down or dampens the movement of the needle valve 16, thus preventing any fluttering or vibration of the valve within the chamber 12. Furthermore, the piston cooperates with the rounded edges of the rectangular valve stem 17, which engage the walls of the valve chamber 12, in maintaining the needle valve 16 in alignment with its seat so that when the valve is closed there will be a positive seating of the needle valve. This prevents the valve from becoming cocked and insures against any leakage of the fluid therethrough.

In the foregoing specification I have described in detail a preferred form of my invention. Various changes and modifications can be made therein without departing from the spirit and scope of my invention, and it is therefore to be understood that my patent is not limited to the preferred form described herein or in any manner other than by the scope of the appended claims.

I claim:

1. In a valve embodying a casing with a valve seat therein, a valve, a hollow stem thereon, said stem having an open ended cylindrical recess therein and an enlarged opening adjacent the open end of said recess to provide a ledge within said stem, a piston slidably mounted within said recess, a valve coupling screw threaded in said casing, a spider secured to the piston and abutting the valve coupling, a spring interposed between the spider and ledge to urge the spider towards the valve coupling and the valve towards the valve seat.

2. In a check valve embodying a casing having a substantially cylindrical chamber therein with inlet and outlet ports communicating therewith, a valve seat formed in the inlet port, a valve having a tapered portion adapted to engage said seat disposed in said cylindrical chamber in slidable engagement with the inner wall thereof and engaging said seat, a hollow stem on said valve, a piston having a piston rod thereon loosely disposed in the hollow stem, a coupling threaded in the outlet port, a spider in said chamber affixed to said piston rod and adapted to abut said coupling, a spring encircling said piston rod and having one end of a larger diameter than the piston, said hollow stem counter bored for the reception of the enlarged end of said spring to retain the valve on said seat and the spider in engagement with said coupling.

3. A valve embodying a casing having a substantially cylindrical chamber with a coupling screw threaded therein, a valve seat of smaller diameter than said chamber formed in said casing coaxially with said chamber and disposed at the end thereof opposite said coupling, a valve member having a tapered portion engageable with said seat and a guide portion slidably engaging the inner wall of said chamber, a piston slidably mounted in the valve member, a spider secured to the piston and abutting the coupling and having portions engageable with the wall of said chamber, and a spring interposed between the spider and valve member to effect a seating of the valve member, and to urge said spider into engagement with said coupling.

4. In a check valve embodying a casing having a substantially cylindrical chamber therein, inlet and outlet ports communicating with said chamber, a valve seat formed in the inlet port, a needle valve member disposed in the chamber and having a conical portion adapted to engage said seat and a hollow body portion in slidable engagement with the inner wall of said cylindrical chamber, said hollow body portion being provided with a ledge within the hollow thereof, a piston slidably mounted in said hollow body portion, a coupling threaded in the outlet port and projecting into said chamber, a spider engaging the inner wall of said chamber and secured to the piston and abutting said coupling, and a spring interposed between said spider and said ledge to urge said needle valve member toward its seat.

ALBERT J. WEATHERHEAD, JR.